United States Patent
Yang et al.

(10) Patent No.: US 10,951,521 B2
(45) Date of Patent: Mar. 16, 2021

(54) METHOD FOR SCHEDULING A COMPUTATIONAL TASK, A METHOD FOR PROCESSING A COMPUTATIONAL TASK, A COMPUTER READABLE STORAGE MEDIUM, A COMPUTER PROGRAM, A RESIDENTIAL GATEWAY, AND A SERVER

(71) Applicant: MAXLINEAR, INC., Carlsbad, CA (US)

(72) Inventors: Bin Yang, Shanghai (CN); Shoumeng Yan, Beijing (CN); Yong Yao, Cupertino, CA (US); Hongyu Zhang, Shanghai (CN); Guobin Zhang, Shanghai (CN)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 15/995,195

(22) Filed: Jun. 1, 2018

(65) Prior Publication Data
US 2019/0044854 A1 Feb. 7, 2019

Related U.S. Application Data

(60) Provisional application No. 62/553,166, filed on Sep. 1, 2017.

(51) Int. Cl.
*H04L 12/721* (2013.01)
*H04L 12/26* (2006.01)
*H04L 29/08* (2006.01)
*H04L 29/06* (2006.01)
*H04W 76/10* (2018.01)

(52) U.S. Cl.
CPC .......... *H04L 45/70* (2013.01); *H04L 43/0876* (2013.01); *H04L 43/16* (2013.01); *H04L 67/32* (2013.01); *H04L 67/10* (2013.01); *H04L 67/42* (2013.01); *H04W 76/10* (2018.02)

(58) Field of Classification Search
CPC ..... H04L 45/70; H04L 43/0876; H04L 43/16; H04L 67/32; H04L 67/10; H04L 67/42; H04W 76/10
USPC ........................................................ 709/224
See application file for complete search history.

(56) References Cited

U.S. PATENT DOCUMENTS

| | | | |
|---|---|---|---|
| 8,104,038 B1* | 1/2012 | Graupner | G06F 9/5044 718/104 |
| 2007/0050490 A1* | 3/2007 | Larkin | G06F 9/4862 709/223 |
| 2010/0272258 A1* | 10/2010 | Sadovsky | G06F 9/5027 380/255 |
| 2012/0054112 A1* | 3/2012 | Gormish | G06Q 10/06 705/301 |
| 2013/0139165 A1* | 5/2013 | Doukhvalov | G06F 21/567 718/102 |
| 2014/0025828 A1* | 1/2014 | Li | G06F 9/505 709/226 |

(Continued)

Primary Examiner — James E Springer
(74) Attorney, Agent, or Firm — Maschoff Brennan (57) ABSTRACT

A method for scheduling a computational task is proposed. The method includes receiving, at a server, a request for executing a computational task from a client device. The method further includes forwarding the computational task to a processing device if a predetermined condition is fulfilled. The predetermined condition can be based on an execution time or on a security level of data of the computational task, for example.

15 Claims, 2 Drawing Sheets (56) References Cited

U.S. PATENT DOCUMENTS

| | | | |
|---|---|---|---|
| 2015/0052614 A1* | 2/2015 | Crowell | G06F 21/566 |
| | | | 726/25 |
| 2016/0232024 A1* | 8/2016 | Hamilton, II | G06F 21/53 |
| 2016/0242025 A1* | 8/2016 | Aliyar | H04W 8/24 |
| 2017/0364342 A1* | 12/2017 | Shuster | G06F 8/61 |
| 2018/0074748 A1* | 3/2018 | Makin | G06F 9/4856 |
| 2018/0091625 A1* | 3/2018 | Hwang | H04L 41/0813 |
| 2018/0173502 A1* | 6/2018 | Biskup | G06F 8/30 |
| 2018/0173510 A1* | 6/2018 | Koshkin | G06F 8/60 |
| 2018/0349150 A1* | 12/2018 | Wong | G06F 9/4492 |
| 2019/0250946 A1* | 8/2019 | Parameshwaran | G06F 9/4856 |

\* cited by examiner

METHOD FOR SCHEDULING A COMPUTATIONAL TASK, A METHOD FOR PROCESSING A COMPUTATIONAL TASK, A COMPUTER READABLE STORAGE MEDIUM, A COMPUTER PROGRAM, A RESIDENTIAL GATEWAY, AND A SERVER

FIELD

Examples relate to methods for scheduling computational tasks, to methods for processing computational tasks, and to computer readable storage mediums and computer programs for performing the methods when executed. Further examples relate to residential gateways and to servers, and to a system comprising a residential gateway and a server.

BACKGROUND

Cloud computing services performed by servers within data centers experience continuously rising interest. Cloud computing models enable providing computing resources to a plurality of client devices. In the cloud computing model, clients can collect data and send requests to a cloud server for further processing. The cloud server handles the requests and sends corresponding responses or results to the clients.

Cloud computing models can be used for smart home applications as well as for a plurality of other customer or business applications. For example, a user can use speech interaction with a voice assistant of a smart home device or a user can use face authentication to access his confidential account. The examples can involve uploading user data to the cloud server, allocating computational resources in the cloud server to process the user data, and sending back the result to the user from the cloud server. Potentially, by using cloud computing, the user may experience latency due to limited network bandwidth and long data round trip times. The user may also experience latency because the cloud server may not be able to timely handle his requests due to limited server compute capacity. Moreover, the user may worry about the privacy of his personal data.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
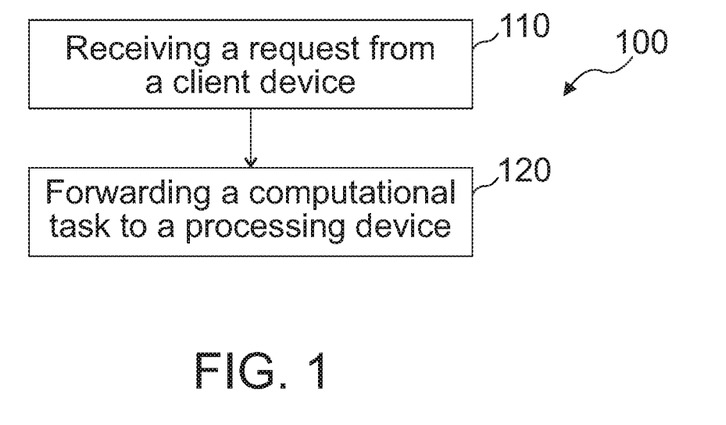
FIG. 1 shows a flow chart of an example of a method for scheduling a computational task.

FIG. 1 shows a flow chart of an example of a method 100 for scheduling a computational task. The method 100 comprises receiving 110 a request for executing a computational task from a client device. The request is received 110 at a server within a data center. The method 100 further comprises forwarding 120 the computational task to a processing device outside the data center. The computational task is forwarded 120 if a predetermined condition is fulfilled.

A computational task may be any computation process or computation function to be performed for enabling a functionality of the client device. A client device may be a user device like a smartphone or any other kind of user device. The client device may be portable and comprise a communication device, e.g. a transceiver, e.g. to enable wireless connections to a mobile network, other client devices, and/or stationary devices like gateways and/or access points for wireless networks, for example. The client device may be configured to establish mobile connections, Bluetooth connections, and/or WLAN connections. The request may be sent for requesting a cloud computing service.

For example, receiving 110 may comprise receiving the request via a mobile broadband connection, e.g. between the client device and the server. The server may be connected to the client device via the internet, e.g. via a mobile radio network. Alternatively, the client device may be connected to a local wireless network connected to the internet so that a connection between the server and the client device can be established. The server may be a cloud server configured to process or execute requests coming from the client device. A cloud server may be a server or another computing entity within a data center that offers computing services (cloud services) to clients. The terms server and cloud server may be used synonymously throughout this specification. A data center is a facility used to house computer systems and associated components, such as telecommunications and storage systems. It may include redundant or backup power supplies, redundant data communications connections, environmental controls (e.g. air conditioning, fire suppression) and various security devices.

The client device may e.g. request the server to process a computational task if a computation capacity of the client device is too low for processing the computational task at the client device or if processing the computational task would cause a high load at the client device. The server then can receive 110 the computational task and may, according to an example, send a result of the computational task back to the client device after having executed the computational task.

According to the method 100, however, it is possible that the computational task is not processed or executed at the server. Instead, the computational task may be forwarded 120. Forwarding 120 may comprise sending the received 110 computational task to another computation device able to execute the computational task, e.g. to the processing device. Accordingly, the method 100 may further comprise executing the computational task at the processing device. The processing device may be a home gateway, for example, and the client device may be connected to the processing device. The processing device may be one of a residential gateway device, and a computing device running a Linux operating system. The processing device may be a personal computer of a user of the client device, the personal computer connected to the server and to the client device, for example. The personal computer may, e.g., provide high computation capacities.

For example, a transfer time for transferring an amount of data between the processing device and the client device may be shorter compared to a transfer time for transferring the same amount of data between the server and the client device. Forwarding 120 may comprise relaying the computational task as received 110. In other words, the server may act as transition point. Alternatively, the computational task may be converted, e.g. with respect to a data format, to ensure that the processing device can execute the computational task, e.g. depending on the kind of processing device used by the method 100. If the computational task is forwarded 120 to the processing device, e.g. the processing device may execute the computational task and send a result to the client device. As a consequence, the client device may receive the solved computational task from the processing device instead of from the server. For example, if the result is received at the client device from the processing device, according to the method 100 the client device may notice no difference compared to receiving the result from the server.

Whether the computational task is forwarded 120 depends on a predefined condition. For example, if the computational task is not forwarded, the computational task may be solved by the server. However, the method 100 may enable reducing a runtime or execution time from sending the request from the client device to receiving the result at the client device, for example by forwarding 120 the computational task. The runtime may depend on computation capacities of the server and the processing device, and on transmission capacities or transmission times of the network between the client device and the server, and the client device and the processing device. The predefined condition may be fulfilled, if forwarding 120 the computational task results in a shorter runtime, and the computational task may be forwarded 120 accordingly.

For example, the predefined condition may be used according to a type of computational task and to corresponding needs. The predefined condition may be based on a complexity of the computational task and/or on a level of privacy of the computational task, for example. As mentioned before, it may be faster (in terms of providing the result of the computational task to the client device) to process the computational task at the processing device and the computational task may be forwarded 120 to the processing device. Alternatively or additionally, a protection of data of the computational task may be higher if the computational task is processed at the processing device and the computational task may be forwarded 120 to the processing device if the computational task comprises private data of a user.

The method 100 may enable to provide a result of the computational task faster to the client device, e.g. by forwarding 120 the computational task from the server to the processing device. Furthermore, the method 100 may increase a security of processing the computational task, e.g. a privacy of data corresponding to the computational task may be increased or the data may be better protected. By providing different predefined conditions, a flexibility of the method 100 may be increased, e.g. the method 100 may be used for various applications, e.g. cloud computing applications. For example, forwarding 120 the computational task to the processing device may enable the processing device to provide cloud computing services. Outsourcing computational tasks from the server to a plurality of processing devices may highly increase a capacity of the server to handle requests for computational tasks. Forwarding 120 computational tasks may reduce requirements of computation capacity of the server so while maintaining the ability of providing cloud service, e.g., so that costs may be reduced.

The predetermined condition may be fulfilled if executing the computational task at the processing device enables sending back a result of the computational task to the client device faster compared to executing the computational task at the server. In other words, the predetermined condition may be fulfilled if the runtime from sending the request from the client device to receiving the result at the client device is reduced when forwarding 120 the computational task to the processing device.

The predetermined condition may be based on a load caused by the computational task. More complex tasks may be forwarded 120, whereas less complex tasks may be executed at the server directly, for example (e.g. if forwarding 120 the computational task would take more time than processing the computational task). The predetermined condition may be fulfilled if the load caused by the computational task exceeds a predetermined threshold. The predetermined threshold may be adapted depending on a computation capacity and/or computation load of the server and/or of the processing device. Consequently, if the computation capacity of the server is higher, the predetermined threshold may be higher.

The predetermined condition may be determined using an amount of data returned to the client device while executing the computational task. The predefined condition may be fulfilled if the amount of data to be returned exceeds a predefined data threshold. The predefined data threshold may depend on a network connection between the server and the client device, for example. If the network connection enables faster transmission of data, the predefined data threshold may be higher. As the processing device may be located closer to the client device, a data transfer time may be shorter from the processing device to the client device than from the server to the client device.

Data to be processed by the cloud service (e.g. required during the execution of the computational task) may be generated by the client device and may be sent faster from the client device to the processing device compared to sending it from the client device to the server. The processing device (e.g. the gateway) may be close to the client device in distance. Depending on application characteristics, the latency saved by executing the computational task on the processing device and sending the result from the processing device may be quite significant. For example, for video transcoding services, if they run in the gateway, the latency may be much less than cloud-based services (e.g. executed by the server) because video uploading to cloud (e.g. the server) may take long (e.g. longer than to the processing device). The threshold may depend on several metrics of a system (such as network bandwidth, network latency, and gateway processing power, e.g.).

Alternatively or additionally, the predetermined condition may be fulfilled if a security level of the computational task is above a predefined security threshold. A functionality of the client device may require personal data or private data of a user of the client device, for example. The predefined security threshold may be adapted by the user, for example the user may give a user input, that the data of the computational task to be performed by the cloud service is private and/or exceeds the predefined security threshold. In other words, the user may indicate that the requested computational task has to be forwarded 120.

For example, the computational task sent by the client device to the server might not comprise private data of the user. The processing device may establish a connection to the client device so that the client device can send the private data required for executing the computational task at the processing device directly to the processing device, e.g. after the computational task has been forwarded 120 to the processing device. Therefore, it may be avoided to send private data to the server as the private data may be sent directly to the processing device. For example, a security level or protection level of the processing device may be higher compared to a security level or protection level of the server. The processing device may be within a secure network of the user, for example the processing device may belong to the user so that the user always knows where his private data is being processed. Using a security level as predetermined condition may increase a level of data protection, while providing cloud computing services.

According to an example, the client device may request a cloud service requiring private data, e.g. face authentication, from a cloud server. The server may receive 110 the request and forward 120 a corresponding computational task to the processing device. For example, the server may send an execution environment to the processing device, enabling the processing device to provide the requested face authentication (e.g. by providing corresponding code to the processing device). However, the private data, for example a picture of a user of the client device, might not have been sent to the server with the request for face authentication. By contrast, after having forwarded 120 the computational task to the processing device, the client device may connect with the processing device and send the private data directly to the processing device so that no private data has to be sent via the server.

According to the method 100, further requests from the client device may be routed directly to the processing device if the computational task is forwarded 120 to the processing device. The server may send a corresponding routing message (e.g. comprising information like an IP-address of the processing device) to the client device (e.g. while or after forwarding 120 the computational task) so that the client device has information where to send the respective data to.

The predetermined condition may be fulfilled if a load caused by the computational task is below a predetermined threshold. For example, a computation capacity at the processing device may be too low so that the processing device would not be able to process or execute the computational task. Forwarding 120 the computational task only, if a load caused by the computational task, for example at the processing device, is below the predetermined threshold may increase a functional safety of the cloud service as the computational task may always be executed successfully. Alternatively or additionally, the predetermined condition may be fulfilled if a load of the server caused by other computational tasks is high. For example, in a first operation mode, a load of the server is low so that the server is able to execute the computational task without significant delay. In this first operation mode, the server may execute the computational task directly and send the result back to the client device without forwarding the computational task to the processing device. Otherwise, for example if numerous other computational tasks or processes are running on the server, for example in a second operation mode, the server may forward 120 the computational task to the processing device, e.g. to avoid delay of providing the result of the computational task to the client device.

The predetermined condition may be fulfilled if a load of a network connection between the server and the client device is above a predefined threshold. For example, a bandwidth of the network may be low and/or a plurality of other processes may transmit data via the network connection, so that a transmission time may be long. The load of the network connection between the server and the client device may be measured, for example by the server. The predefined threshold may depend on an amount of data corresponding to the computational task. If the predefined threshold is exceeded, the computational task can be forwarded 120 to the processing device, so that only a small amount of data, for example the computational process without additionally required data, may be sent to the processing device. Additionally required data may be sent from the client device directly to the processing device, for example via a wireless connection providing fast data transmission.

The method 100 may further comprise receiving, at the server, a registration message from at least one processing device of a plurality of processing devices. The registration message may indicate a capability to process an execution environment. The registration message may be used to indicate that a processing device is able to execute computational tasks. By having registered a plurality of processing devices at the server, the server has the possibility to for example select one or more processing devices to forward respective computational tasks to the processing devices. The registration message may comprise indications about computation capacity and/or data storage capacity of the processing device and/or data transmission capacity from the processing device to a client device. The registration message may comprise an indication about a radio area or wireless network range of the processing device in which a client device can connect to the processing device, for example to receive the result of the computational task and/or to send additional data to the processing device.

Forwarding the computational task may comprise creating an execution environment which includes an executable file that corresponds to the computational task, and forwarding the execution environment to the processing device. In other words, the computational task may be converted into an execution environment. The execution environment may be sent to the processing device. The execution environment may be adapted to processing capacities of the processing device, for example with respect to a data format.

The execution environment and the executable files may be compliant with the Docker format or with Linux containers. Linux containers may be LXC containers. Also, other virtualization methods like OpenVZ may be used. Creating and sending the execution environment from the server to the processing device may ensure that the computational task can be executed on the processing device. Using the Docker format may be used to manage and schedule thousands of container instances as Docker is equipped with Orchestration.

Forwarding 120 the computational task may comprise selecting the processing device from a plurality of available processing devices according to a selection criterion. For example, a registration list comprising all registered processing devices it may be available at the server. The registration list may indicate geographical positions of the processing devices, for example. According to the selection criterion, the processing device being located closest to the client device may be chosen. A geo-position of the client device may be sent to the server. A short spatial distance may enable transmitting data faster between the client device and the processing device. The selection criterion may be a computational load acceptable by an available processing device, a distance, e.g. a spatial distance and/or a round trip time and/or a downstream, between the client device and an available processing device, and a signal propagation time between the client device and an available processing device. The respective parameters of the processing devices may be provided within the registration list.

The method 100 may further comprise establishing a connection between the client device and the processing device. Establishing a connection from the processing device to the client device may be necessary, for example if other processing devices than a processing device of a user of the client device is used for executing the computational task. For example, a public gateway or public Internet access point (or, a private processing device of another user) may be used as processing device and a connection may be established between the client device and the processing device so that the client device can at least receive a result of the computational task from the processing device. According to this example, by establishing a connection, a plurality of processing devices former unknown (or not connected) to the client device can be used for executing the computational task. For example, the server can send connection data (for example a password) to the processing device and a corresponding connection data to the client device so that a secure connection can be established. For example, the connection may be configured to be used exclusively for transferring the result of the computational task from the processing device to the client device and/or for transmitting data concerning the computational task between the processing device and the client device.

Establishing the connection may comprise establishing a wireless local area network connection between the client device and the processing device. Both the client device and the processing device may be equipped with corresponding wireless transceivers. For example, transmitting data via the wireless local area network connection may be faster than transmitting data via a radio link from the server to the client device, so that a result of the computational task may be provided faster to the client device via the wireless local area network connection.

According to an example, the method 100 may further comprise monitoring the execution of the computational task at the processing device by the server. Once the processing device has started executing the computational task, the processing device may start sending status data to the server, so that monitoring the execution is possible. For example, by monitoring the execution, the server can schedule other computational tasks to the processing device, for example if the execution is almost finished. Otherwise, for example if the execution is still running for a time longer than a threshold time, the server can select another processing device for forwarding 120 the computational task to.

Monitoring may comprise receiving, at the server, status data from the processing device for monitoring the execution of the computational task. The status data may indicate the status of executing the computational task. For example, the status data may indicate whether the computational task is executed without problems or whether an error has occurred. Monitoring the execution of the computational task from the server may improve a functionality of a cloud service. For example, if an error occurs, the server may continue executing the computational task and send a respective result to the client device. For example, the status data may comprise at least one of a status of execution of the computational task, a completing proportion of the computational task, and a duration of the computational task. Evaluating the status data may enable improved distribution of computational tasks between a plurality of processing devices. For example, if Docker containers are used, the Docker image/process may send the status data to server regularly through a TCP/IP channel (e.g. with 10 s interval). Receiving status data may comprise receiving, at the server, the status data regularly or at least once every 10 seconds (or once every 5 seconds, or once every second).

The method 100 may further comprise executing the computational task at the server if the computational task at the processing device enters an abnormal state. As mentioned, the server may monitor the execution at the processing device. For example, if an error is indicated by the status data, the server may interrupt the execution of the computational task at the processing device and start executing the computational task at server. It may be possible, that a first part of the computational task is already executed successfully by the processing device. The first part may be sent from the processing device to the server and the server may continue executing the computational task to provide a complete result of the computational task to the client device, for example. Alternatively, the server may restart executing the complete computational task. For example, after interrupting the execution at the processing device, data (e.g. additionally required data) may be sent from the client device to the server instead from the client device to the processing device.

For example, the server may interrupt the execution of the computational task at the processing device and may continue executing the computational task at the server if the client device leaves a connection range, e.g. a radio area, of the processing device and/or comes close to a limit of the connection range. The connection range may be defined by a transmission area of the processing device, e.g. by a transmission range of a WLAN signal or Bluetooth signal between the processing device and the client device. The processing device or the client device may inform the server (e.g. by sending an information signal), if a signal power of a connection between the processing device and the client device is getting low, e.g. below a predefined threshold. The information may be send within the status data. For example, if the signal power is getting lower, the server may estimate that the client device is going to leave the connection range of the processing device. To enable completion of executing the computational task, the server can take back the computational task from the processing device and continue executing the computational task at the server to enable sending a result of the computational task from the server to the client device, for example also in the case that the client device has left the connection range of the processing device. The server may interrupt executing the computational task at the processing device if a user changes her position so that a position of the client device changes accordingly.

In an example, the server may interrupt the execution of the computational task at the processing device and continue executing the computational task, if a computational capacity of the processing device is below a predefined threshold. For example, when forwarding 120 the computational task to the processing device, a computational load of the processing device may be low. While executing the computational task, other processes may be started at the processing device, resulting in a higher workload of the processing device. Consequently, the computational capacity may drop below the predefined threshold. To ensure sending the result of the computational task to the client device in time, the server may take back the computational task from the processing device and continue and/or finish it at the server.

The server may interrupt the execution of the computational task at the processing device and continue computing the computational task at the server, if transmitting a preliminary result of the computational task to the server, completing the computational task at the server and transmitting a result of the computational task from the server to the client device takes less time compared to completing the computational task at the processing device and transmitting the result of the computational task to the client device. For example, computation times of the server and the processing device and/or data transmission times between the server and the client device and between the processing device and the client device may be estimated to enable predicting respective durations until a result of the computational task can be sent back to the client device.

Alternatively or additionally, the server may interrupt the computation at the processing device if the client device sends a cancellation signal to the server. For example, for a functionality of the client device it may have become unnecessary since requesting computing the computational task to have the result of the computational task. By interrupting the computation, computation capacities might not be used unnecessarily, for example.

For example, the server may interrupt executing the computational task at the processing device when a computing resource of the processing device (for example a gateway) is not (high) enough to complete the computational task in a predefined time period. The server may interrupt executing the computational task when a user, for example a user of the client device, cancels the computational task. The server may take the computational tasks back when the computing resource in gateway is not enough to complete the computing task in time and/or the users changes their position.

Alternatively, the server may interrupt executing the computational task at the processing device and forward the computational task to another, second processing device, e.g. located closer to the client device. Changing processing devices, e.g. while providing cloud services, may enable continuously providing cloud services by using processing device for execution of computational task, e.g. also if the client device moves. In other words, instead of executing the computational task at the server after interrupting execution of the computational task at the processing device, another processing device may be used for executing the computational task.

The computational task may be performing a function of at least one of a smart home installation, a personal assistant service, and a cloud computing service. Outsourcing the execution of the computational task from the client device may improve a quality of service, for example. The method 100 may be performed at a server to improve cloud computing services.

Figure 2:
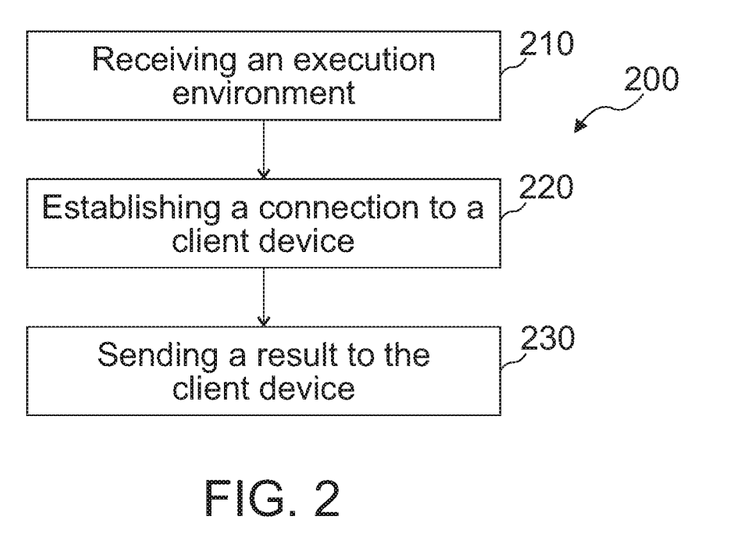
FIG. 2 shows a flow chart of an example of a method for processing a computational task.

FIG. 2 shows a flow chart of an example of a method 200 for processing a computational task. The method 200 comprises receiving 210, at a processing device, an execution environment corresponding to a computational task from a server and executing the computational task at the processing device. The method 200 comprises establishing 220 a wireless connection to a client device, and sending 230 a result of the computational task to the client device.

The method 200 may further comprise interrupting executing the computational task at the processing device, if an interruption signal is received from the server, and sending a preliminary result of the computational task to the server.

For example, sending the result of the computational task may comprise sending the result to the client device via an encrypted connection. For example, data required additionally for executing the computational task at the processing device may be received at the processing device from a client device via an encrypted connection.

The method 200 may further comprise sending status data from the processing device to the server, the status data comprising at least one of a status of execution of the computational task, a completing proportion of the computational task, and a duration of the computational task. For example, the status data is sent regularly or at least once every 10 seconds.

The method 200 may be used at a processing device like a home gateway to improve cloud services, for example.

More details and aspects are mentioned in connection with the embodiments described above or below. The embodiments shown in FIG. 2 may comprise one or more optional additional features corresponding to one or more aspects mentioned in connection with the proposed concept or one or more embodiments described above or below (e.g. FIGS. 1, 3, and 4).

Figure 3:
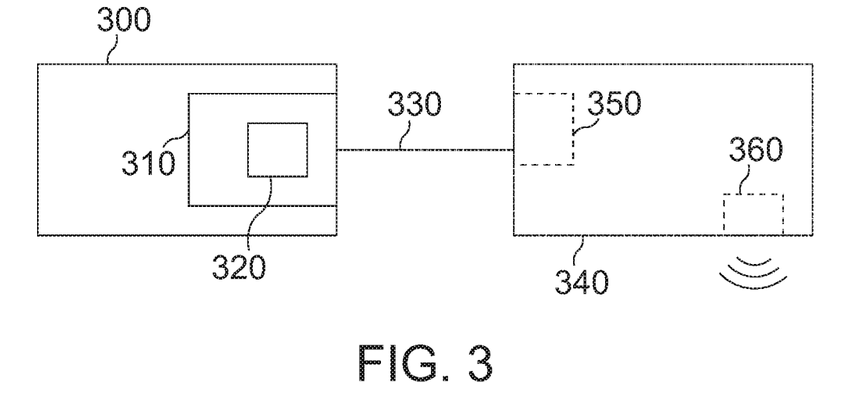
FIG. 3 shows an example of a residential gateway connectable to a server, and a server.

FIG. 3 shows an example of a residential gateway 300 connectable to a server 340. The residential gateway device 300 comprises an output interface 310 configured to transmit a registration message 320 to a server, e.g. the server 340, the registration message indicating a capability to process an execution environment. For example, the residential gateway may further comprise a modem configured to connect to a network medium. For example, the modem may be configured to connect to cable network or to a digital subscriber line network. The residential gateway 300 may be connected to the server 340 via a connection 330, according to an example, e.g. to provide a system for performing cloud computing or provide cloud services.

For example, the residential gateway 300 may be configured to receive a computational task from a server and to execute the computational task. For example, the residential gateway 300 is configured to establish a connection to a client device. For example, the residential gateway is configured to send status data for monitoring the execution of the computational task, e.g. at least once every 10 seconds in an operating mode.

The residential gateway 300 may be configured to receive an interruption signal from the server, wherein the residential gateway is configured to interrupt executing the computational task after receiving an interruption signal. For example, the residential gateway may be configured to send a preliminary result of the computational task to the server if executing the computational task is interrupted. The residential gateway 300 may be connected to the server 340, e.g. to provide a cloud computing system, e.g. for a client device.

The server 340 comprises an input interface 350 configured to receive a request for executing a computational task from a client device. The server 340 further comprises an output interface configured to forward the computational task to a processing device if a predetermined condition is fulfilled.

The server may comprise a work load estimator, configured to estimate a load caused by the computational task at the server and at the processing device and/or an output interface configured to send an interruption signal to at least one processing device. It may be possible to send the interruption signal via an output interface 360, e.g. via a wireless connection. The server may comprise an execution environment creator configured to create an execution environment which includes an executable file that corresponds to the computational task. It may be possible to send the execution environment to the residential gateway 300 via the connection 330.

For example, the server 340 may comprise a registration input configured to receive a registration message from at least one processing device, e.g. the residential gateway 300, of a plurality of processing devices, the registration message indicating a capability to process an execution environment. The server may further comprise a selector, configured to select the processing device from a plurality of available processing devices according to a selection criterion and/or a task monitor, configured to monitor the execution of the computational task at the processing device.

More details and aspects are mentioned in connection with the embodiments described above or below. The embodiments shown in FIG. 3 may comprise one or more optional additional features corresponding to one or more aspects mentioned in connection with the proposed concept or one or more embodiments described above or below (e.g. FIGS. 1, 2, and 4).

Figure 4:
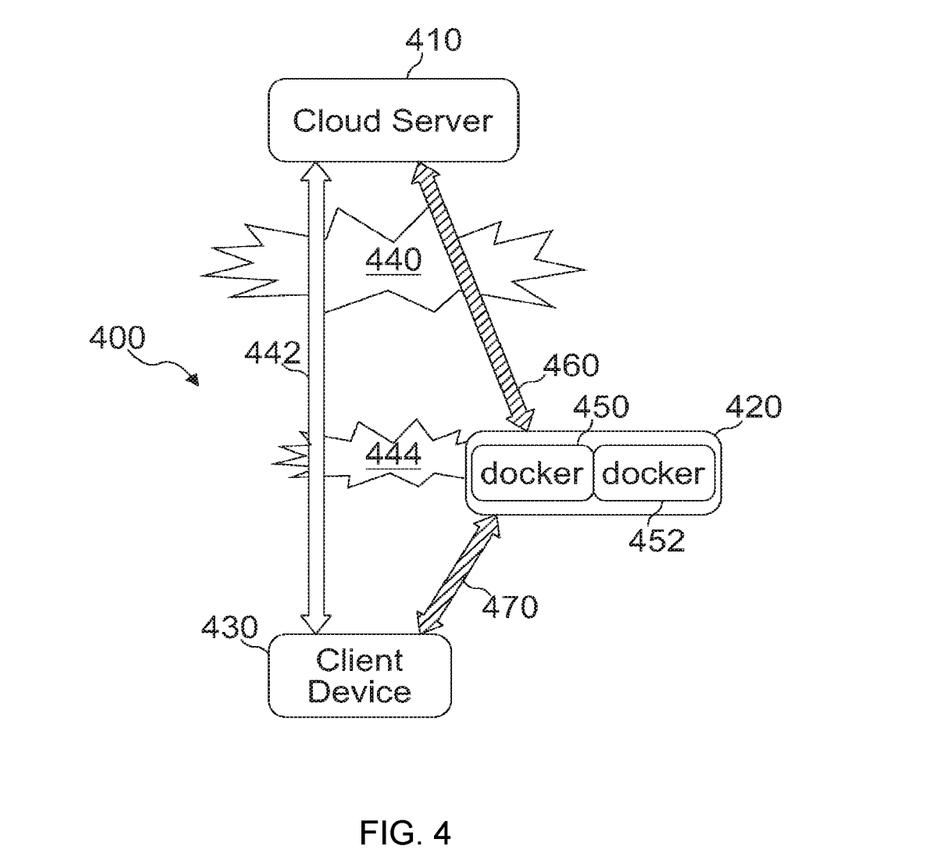
FIG. 4 shows an example for scheduling computational tasks from a client device.

FIG. 4 shows an example 400 for scheduling computational tasks from a client device, e.g. an example of a computing model of a cloud service.

For cloud service, a container system may be used, e.g. docker, a tool designed to make it easier to create, deploy, and run applications by using containers. Containers allow a developer to package up an application with all of the parts it needs, such as libraries and other dependencies, and ship it all out as one package, for example. By doing so, the application may run on any other operating system, e.g. a Linux machine, regardless of any customized settings.

Based on docker technology, it is proposed to solve cloud computing issues with a new computing model using smart gateway that may wrap server side computation as a stand-alone and distributable unit (e.g. called ServerLet, e.g. the execution environment) using Linux Container technology. The ServerLet may be deployed (e.g. from a cloud server 410, e.g. a server 340) onto a smart gateway 420 (e.g. the residential gateway 300) close to the client side data source (e.g. a client device 430) and the client side may be transparently coupled with the local ServerLet for subsequent processing. Server side processing may be offloaded to local computing nodes (e.g. smart gateway) and data might not be transported over public network, so that e.g. latency and privacy issues can be alleviated. Also, the proposed concepts may be transparent to both client side and server side applications, e.g. by implementation in the system level, so that the local offloading works automatically and/or hidden, for example.

An exemplary protocol of a proposed computing model is provided:
1. First, an application running on a compute-constrained client device 430 (e.g. Mobile phone or smart devices) will send a computing request 442 to cloud server 410, e.g. when there is requirement from a user.
2. This request will be send to Internet network 440 through wireless network 444 (e.g. 4G) or Wi-Fi network 444.
3. Cloud server 410 who is running in the Internet network 440 will get the request 442.
4. Cloud 410 will deal with the request 442.
5. If the task is not heavy and time consumed, server 410 will do it by itself and send response to client device 430 using the original path.
6. If the task is heavy and time consumed, cloud server 410 will create a docker image 450, 452. This image is an execution environment contains binary to execute same function in cloud server, which can be executed in a Linux computer.
7. Server 410 will start to find a home gateway 420 near to the client devices 430 which send the request.
8. The gateway 420 will set up connection 460 with cloud server 410 to get the image 450, 452 and will run the image by using docker technology.
9. From now on, the request, e.g. further requests, of client device 430 will be routed to local gateway computer 420. For example, additional data required for executing the computational task may be sent directly to the processing device 420, e.g. via a wireless link 470, instead of sending the additional data to the server 410.
10. Cloud server will monitor the state of image in gateway, if the state is abnormal, the request from client devices will be routed again to cloud server.

For example, the local computers, e.g. processing devices, need to register themselves to the cloud side, e.g. the server, so that they can be discovered when the cloud needs their help.

In some cloud compute models, latency, privacy and scalability may be a main concern. By providing the proposed compute model data may be processed by docker instance in a smart gateway, which e.g. may improve the security of data. Further, the latency from device to cloud server may be reduced, which e.g. improves user experience. The data collected by devices might not need to be send to a could server, which e.g. may save the bandwidth of cloud server. The tasks may be executed in nearby smart gateway, which e.g. may improve the scalability of a server which may enable providing services for millions of users at the same time.

According to the proposed concepts an overhead brought by a docker instance may be very small, so one gateway may serve for many client devices without negative effects on user experience. For example, docker is supported by most of latest Linux releases, e.g. deployability (e.g. application) might not be a problem.

More details and aspects are mentioned in connection with the embodiments described above or below. The embodiments shown in FIG. 4 may comprise one or more optional additional features corresponding to one or more aspects mentioned in connection with the proposed concept or one or more embodiments described above or below (e.g. FIGS. 1 to 3).

Examples relate to a network computing model based on container and smart gateway. This computing model e.g. requires local deployment of computation resources in addition to cloud side computation resources, which therefore may boost adoption of cloud computing platforms. Also, this may improve user experiences in terms of latency, bandwidth, and privacy.

According to a proposed computation model, computation may be offloaded to local gateway and/or docker image may be used to dispatch computational tasks from cloud to local gateway. Interaction protocols between cloud and local gateway are proposed (e.g. local gateway registration to cloud, cloud discovery of local gateways, and/or cloud task dispatch to registered local gateways).

The proposed concepts may provide specific data sheet and/or specifications, e.g. to enable supporting offloading computation to local gateway or other computers. For example, proposed concepts can use specific communication between cloud and client, and/or between client and local gateway.

Further aspects relate to a computer readable storage medium having stored thereon a program having a program code for performing one of the preceding methods, when the program is executed on a computer or processor, and to a computer program having a program code configured to perform the method of one of the preceding methods, when the computer program is executed on a computer or processor.

Further examples relate to further aspects of the application.

Example 1 relates to a method for scheduling a computational task within a data center, the method comprising: receiving, at a server within the data center, a request for executing a computational task from a client device; and forwarding the computational task to a processing device outside the data center if a predetermined condition is fulfilled.

Example 2 relates to the method according to example 1, wherein the predetermined condition is fulfilled if executing the computational task at the processing device enables sending back a result of the computational task to the client device faster compared to executing the computational task at the server.

Example 3 relates to the method according to example 1 or 2, wherein the predetermined condition is based on a load caused by the computational task.

Example 4 relates to the method according to example 3, wherein the predetermined condition is fulfilled if the load caused by the computational task exceeds a predetermined threshold.

Example 5 relates to the method according to one of the preceding examples, wherein the predetermined condition is determined using an amount of data returned to the client device while executing the computational task.

Example 6 relates to the method according to one of the preceding examples, wherein the predetermined condition is fulfilled if a security level of the computational task is above a predefined security threshold.

Example 7 relates to the method according to one of the preceding examples, wherein the predetermined condition is fulfilled if a load caused by the computational task is below a predetermined threshold or if a load of the server caused by other computational tasks is low.

Example 8 relates to the method according to one of the preceding examples, wherein the predetermined condition is fulfilled if a load of a network connection between the server and the client device is below a predefined threshold.

Example 9 relates to the method according to one of the preceding examples, further comprising: receiving, at the server, a registration message from at least one processing device of a plurality of processing devices, the registration message indicating a capability to process an execution environment.

Example 10 relates to the method according to one of the preceding examples, wherein forwarding the computational task comprises: creating an execution environment which includes an executable file that corresponds to the computational task; and forwarding the execution environment to the processing device.

Example 11 relates to the method according to one of the preceding examples, wherein forwarding the computational task comprises: selecting the processing device from a plurality of available processing devices according to a selection criterion.

Example 12 relates to the method according to example 11, wherein the selection criterion is at least one of: a computational load acceptable by an available processing device, a spatial distance between the client device and an available processing device, and a signal propagation time between the client device and an available processing device.

Example 13 relates to the method according to one of the preceding examples, wherein the execution environment and the executable files are compliant with the Docker format or with linux containers.

Example 14 relates to the method according to one of the preceding examples, further comprising: establishing a connection between the client device and the processing device.

Example 15 relates to the method according to one of the preceding examples, wherein establishing the connection comprises establishing a wireless local area network connection between the client device and the processing device.

Example 16 relates to the method according to one of the preceding examples, further comprising: executing the computational task at the processing device.

Example 17 relates to the method according to example 16, further comprising: monitoring the execution of the computational task at the processing device by the server.

Example 18 relates to the method according to example 17, the monitoring comprising: receiving, at the server, status data from the processing device for monitoring the execution of the computational task.

Example 19 relates to the method according to example 18, wherein the status data comprises at least one of a status of execution of the computational task, a completing proportion of the computational task, and a duration of the computational task.

Example 20 relates to the method according to example 18 or 19, the receiving comprising: receiving, at the server, the status data regularly or at least once every 10 seconds.

Example 21 relates to the method according to one of examples 17 to 20, further comprising: executing the computational task at the server if the computational task at the processing device enters an abnormal state.

Example 22 relates to the method according to one of examples 17 to 21, wherein the server interrupts the execution of the computational task at the processing device and continues executing the computational task at the server, if the client device leaves a connection range of the processing device.

Example 23 relates to the method according to one of examples 17 to 22, wherein the server interrupts the execution of the computational task at the processing device and continues executing the computational task, if a computational capacity of the processing device is below a predefined threshold.

Example 24 relates to the method according to one of examples 17 to 23, wherein the server interrupts the execution of the computational task at the processing device and continues computing the computational task at the server, if transmitting a preliminary result of the computational task to the server, completing the computational task at the server and transmitting a result of the computational task from the server to the client device takes less time compared to completing the computational task at the processing device and transmitting the result of the computational task to the client device. An example relates to the method according to one of the preceding examples further comprising routing further requests from the client device directly to the processing device if the computational task is forwarded to the processing device.

Example 25 relates to the method according to one of examples 17 to 24, wherein the server interrupts the computation at the processing device if the client device sends a cancellation signal to the server.

Example 26 relates to the method according to one of the preceding examples, further comprising: receiving, at the server, the request via a mobile broadband connection.

Example 27 relates to the method according to one of the preceding examples, wherein the processing device is one of a residential gateway device, and a computing device running a Linux operating system.

Example 28 relates to the method according to one of the preceding examples, wherein the computational task is performing a function of at least one of a smart home installation, a personal assistant service, and a cloud computing service.

Example 29 relates to a method for processing a computational task comprising: receiving, at a processing device outside a data center, an execution environment corresponding to a computational task from a server within the data center and executing the computational task at the processing device; establishing a wireless connection to a client device; and sending a result of the computational task to the client device.

Example 30 relates to the method according to example 29, further comprising interrupting executing the computational task at the processing device, if an interruption signal is received from the server; and sending a preliminary result of the computational task to the server.

Example 31 relates to the method according to example 29 or 30, wherein sending the result of the computational task comprises sending the result to the client device via an encrypted connection.

Example 32 relates to the method according to one of examples 29 to 31, further comprising: sending status data from the processing device to the server, the status data comprising at least one of a status of execution of the computational task, a completing proportion of the computational task, and a duration of the computational task, wherein the status data is sent regularly or at least once every 10 seconds Example 33 relates to a residential gateway device, comprising: an output interface configured to transmit a registration message to a server within a data center, the registration message indicating a capability to process an execution environment.

Example 34 relates to the residential gateway of example 33, further comprising a modem configured to connect to a network medium.

Example 35 relates to the residential gateway of example 34, wherein the modem is configured to connect to cable network or to a digital subscriber line network.

Example 36 relates to the residential gateway according to one of examples 33 to 35, wherein the residential gateway is configured to receive a computational task from a server within the data center and to execute the computational task.

Example 37 relates to the residential gateway according to one of examples 33 to 36, wherein the residential gateway is configured to establish a connection to a client device.

Example 38 relates to the residential gateway according to one of examples 36 to 37, wherein the residential gateway is configured to send status data for monitoring the execution of the computational task.

Example 39 relates to the residential gateway according to example 38, wherein the residential gateway sends the status data at least once every 10 seconds in an operating mode.

Example 40 relates to the residential gateway according to one of examples 36 to 39, wherein the residential gateway is configured to receive an interruption signal from the server, wherein the residential gateway is configured to interrupt executing the computational task after receiving an interruption signal.

Example 41 relates to the residential gateway of example 40, wherein the residential gateway is configured to send a preliminary result of the computational task to the server if executing the computational task is interrupted.

Example 42 relates to a server within a data center comprising: an input interface configured to receive a request for executing a computational task from a client device outside the data center; and an output interface configured to forward the computational task to a processing device outside the data center if a predetermined condition is fulfilled.

Example 43 relates to the server of example 42 further comprising a work load estimator, configured to estimate a load caused by the computational task at the server and at the processing device.

Example 44 relates to the server of example 42 or 43, further comprising an output interface configured to send an interruption signal to at least one processing device.

Example 45 relates to the server according to one of examples 42 to 44 further comprising an execution environment creator configured to create an execution environment which includes an executable file that corresponds to the computational task.

Example 46 relates to the server according to one of examples 42 to 45 further comprising a registration input configured to receive a registration message from at least one processing device of a plurality of processing devices, the registration message indicating a capability to process an execution environment.

Example 47 relates to the server according to one of examples 42 to 46 further comprising a selector, configured to select the processing device from a plurality of available processing devices according to a selection criterion.

Example 48 relates to the server according to one of examples 42 to 47 further comprising a task monitor, configured to monitor the execution of the computational task at the processing device.

Example 49 relates to a computer readable storage medium having stored thereon a program having a program code for performing one of the preceding methods, when the program is executed on a computer or processor.

Example 50 relates to a computer program having a program code configured to perform the method of one of the preceding methods, when the computer program is executed on a computer or processor.

An example relates to an apparatus comprising means to perform a method as defined in any preceding example.

An example relates to a system comprising a server according to one of the previous examples and a residential gateway according to one of the previous examples.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for scheduling a computational task within a data center, the method comprising:
   receiving, at a server within the data center, a request for executing a computational task from a client device; and
   forwarding the computational task to a processing device outside the data center if a predetermined condition is fulfilled,
   wherein the predetermined condition is fulfilled if a security level of the computational task is above a predefined security threshold, wherein forwarding the computational task comprises:
      creating an execution environment which includes an executable file that corresponds to the computational task; and
      forwarding the execution environment to the processing device.

2. The method according to claim 1, wherein the predetermined condition is based on a load caused by the computational task.

3. The method according to claim 1, wherein the predetermined condition is determined using at least one of an amount of data returned to the client device and an amount of data sent from the client device while executing the computational task.

4. The method according to claim 1, wherein the predetermined condition is fulfilled if a load of a network connection between the server and the client device is above a predefined threshold.

5. The method according to claim 1, further comprising:
receiving, at the server, a registration message from at least one processing device of a plurality of processing devices, the registration message indicating a capability to process an execution environment.

6. The method according to claim 1, wherein forwarding the computational task comprises:
selecting the processing device from a plurality of available processing devices according to a selection criterion.

7. The method according to claim 6, wherein the selection criterion is at least one of:
a computational load acceptable by an available processing device, a distance between the client device and an available processing device, and a signal propagation time between the client device and an available processing device.

8. The method according to claim 1, wherein the execution environment and the executable files are compliant with the Docker format or with Linux containers.

9. The method according to claim 1, further comprising:
executing the computational task at the processing device.

10. The method according to claim 1, further comprising:
routing further requests from the client device directly to the processing device if the computational task is forwarded to the processing device.

11. The method according to claim 9, further comprising:
monitoring the execution of the computational task at the processing device by the server.

12. The method according to claim 11, further comprising:
executing the computational task at the server if the computational task at the processing device enters an abnormal state.

13. The method according to claim 11, wherein the server interrupts the execution of the computational task at the processing device and continues executing the computational task at the server, if the client device leaves a connection range of the processing device.

14. The method according to claim 11, wherein the server interrupts the execution of the computational task at the processing device and continues executing the computational task, if a computational capacity of the processing device is below a predefined threshold.

15. The method according to claim 11, wherein the server interrupts the execution of the computational task at the processing device and continues computing the computational task at the server, if transmitting a preliminary result of the computational task to the server, completing the computational task at the server and transmitting a result of the computational task from the server to the client device takes less time compared to completing the computational task at the processing device and transmitting the result of the computational task to the client device.

* * * * *